(12) United States Patent
Bijwaard

(10) Patent No.: US 9,680,880 B2
(45) Date of Patent: Jun. 13, 2017

(54) METHOD AND APPARATUS FOR SUPPORTING IP MULTICAST

(75) Inventor: Dennis Bijwaard, Enschede (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2603 days.

(21) Appl. No.: 11/456,607

(22) Filed: Jul. 11, 2006

(65) Prior Publication Data
US 2008/0016191 A1      Jan. 17, 2008

(51) Int. Cl.
G06F 15/16      (2006.01)
H04L 29/06      (2006.01)
H04L 12/18      (2006.01)
H04L 12/24      (2006.01)

(52) U.S. Cl.
CPC .......... H04L 65/1006 (2013.01); H04L 12/18 (2013.01); H04L 41/08 (2013.01); H04L 41/0853 (2013.01); H04L 65/4076 (2013.01)

(58) Field of Classification Search
USPC ........................................ 709/227
See application file for complete search history.

(56) References Cited

U.S. PATENT DOCUMENTS

| | | | |
|---|---|---|---|
| 5,355,371 A | | 10/1994 | Auerbach et al. |
| 5,905,871 A | * | 5/1999 | Buskens et al. ............. 709/238 |
| 6,181,697 B1 | * | 1/2001 | Nurenberg et al. .......... 709/238 |
| 6,324,575 B1 | * | 11/2001 | Jain et al. ................... 709/221 |
| 6,507,863 B2 | * | 1/2003 | Novaes ........................ 709/201 |
| 6,594,703 B1 | * | 7/2003 | Li ................................ 709/235 |
| 6,606,706 B1 | * | 8/2003 | Li ................................ 713/162 |
| 6,636,895 B1 | * | 10/2003 | Li et al. ...................... 709/238 |
| 6,639,918 B1 | * | 10/2003 | Hauck et al. ................ 370/462 |
| 6,728,777 B1 | | 4/2004 | Lee et al. |

(Continued)

FOREIGN PATENT DOCUMENTS

EP      1379038 A1 *  1/2004
JP      2006324981 A  * 11/2006

OTHER PUBLICATIONS

ENME: an Enriched Media Application Utilizing Context for Session Mobility; Technical and Human Issues, EUC Workshops, 2005, pp. 316-325 http://www.springerlink.com/content/f574v3575w333j26/fulltext.pdf.*

(Continued)

Primary Examiner — Jeffrey R Swearingen
(74) Attorney, Agent, or Firm — Tong, Rea, Bentley & Kim, LLC

(57) ABSTRACT

The invention includes a method and apparatus for configuring legacy nodes to support multicast functions. The method includes determining, in response to a request for a first user device to join a multicast group, whether any node in a multicast path between the first user device and a second user device comprises a legacy node and forming, in response to a determination that a node in the multicast path is a legacy node, a message adapted for configuring the legacy node to start forwarding multicast traffic from a first interface to a second interface of the legacy node. The legacy node may be configured to stop forwarding multicast traffic from the first interface of the legacy node to the second interface of the legacy node. The legacy node may be configured to start/stop forwarding traffic from one or more input interfaces to one or more output interfaces.

21 Claims, 5 Drawing Sheets

(56) References Cited

U.S. PATENT DOCUMENTS

| | | | |
|---|---|---|---|
| 6,853,639 B1* | 2/2005 | Watanuki et al. | 370/390 |
| 6,912,205 B2* | 6/2005 | Perlman et al. | 370/254 |
| 6,937,574 B1* | 8/2005 | Delaney et al. | 370/254 |
| 6,965,883 B2 | 11/2005 | Xu et al. | |
| 7,031,308 B2 | 4/2006 | Garcia-Luna-Aceves et al. | |
| 7,085,244 B2 | 8/2006 | Koskelainen et al. | |
| 7,502,926 B2* | 3/2009 | Luo et al. | 713/163 |
| 7,587,591 B2* | 9/2009 | Lebovitz et al. | 709/240 |
| 7,620,045 B2* | 11/2009 | Igarashi et al. | 370/390 |
| 7,701,937 B2* | 4/2010 | Narayanan et al. | 370/390 |
| 7,860,016 B1* | 12/2010 | Vijendra et al. | 370/242 |
| 7,936,752 B2* | 5/2011 | Boers et al. | 370/390 |
| 7,941,826 B2* | 5/2011 | Liu et al. | 726/3 |
| 7,949,737 B2* | 5/2011 | Tan | 709/223 |
| 8,006,098 B2* | 8/2011 | Aupperle et al. | 713/185 |
| 2002/0101873 A1* | 8/2002 | Perlman et al. | 370/400 |
| 2004/0088309 A1 | 5/2004 | Koh et al. | |
| 2004/0107234 A1* | 6/2004 | Rajahalme | 709/200 |
| 2004/0125756 A1* | 7/2004 | Lepore et al. | 370/261 |
| 2006/0221859 A1 | 10/2006 | Bijwaard et al. | |

OTHER PUBLICATIONS

Li, Victor et al. "Internet Multicast Routing and Transport Control Protocols." Proceedings of the IEEE. vol. 90, No. 3. Mar. 2002. 360-91.*

Harris, Michael, "OSPF Notes," Nov. 8, 2000, STChas.edu, all pages.

* cited by examiner

METHOD AND APPARATUS FOR SUPPORTING IP MULTICAST

FIELD OF THE INVENTION

The invention relates to the field of communication networks and, more specifically, to multicast streams.

BACKGROUND OF THE INVENTION

Internet Protocol (IP) multicast is a bandwidth-conserving technology that delivers IP traffic conveying a single stream of information from a transmitter to multiple receivers which form a multicast group. IP multicast may be used for numerous applications such as videoconferencing, distance learning, software distribution, and the like. IP multicast streams are routed through the network by multicast routers supporting various multicast protocols for managing multicast group membership, replicating IP multicast packets, and performing like functions associated with IP multicast. For example, multicast routers may support multicast protocols such as Protocol Independent Multicast (PIM), Internet Group Management Protocol (IGMP), Multicast Listener Discovery (MLD), and the like. Since networks often include routers which do not support IP multicast, user devices which require IP multicast traffic to traverse one or more such routers which do not support IP multicast may be prevented from participating in a multicast group.

SUMMARY OF THE INVENTION

Various deficiencies in the prior art are addressed through the invention of a method and apparatus for configuring legacy nodes to support multicast functions. The method includes determining, in response to a request for a first user device to join a multicast group, whether any node in a multicast path between the first user device and a second user device comprises a legacy node and forming, in response to a determination that a node in the multicast path is a legacy node, a message adapted for configuring the legacy node to start forwarding multicast traffic from a first interface to a second interface of the legacy node. The legacy node may be configured to stop forwarding multicast traffic from the first interface of the legacy node to the second interface of the legacy node. The legacy node may be configured to start/stop forwarding traffic from one or more input interfaces to one or more output interfaces. In one embodiment, a legacy router may be manually configured to start/stop forwarding traffic between interfaces.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables dynamic configuration of legacy routers (i.e., routers lacking IP multicast functionality) such that the legacy routers may operate in a manner similar to multicast routers (i.e., routers supporting IP multicast functionality). A legacy router may be configured using one or more messages of various protocols/formats. The present invention enables signaling other than multicast protocol signaling to be used for managing IP multicast groups. As such, the present invention obviates the need for service providers to upgrade or replace existing legacy routers in order to provide IP multicast functions. In other words, the present invention enables dynamic configuration of legacy routers.

Figure 1:
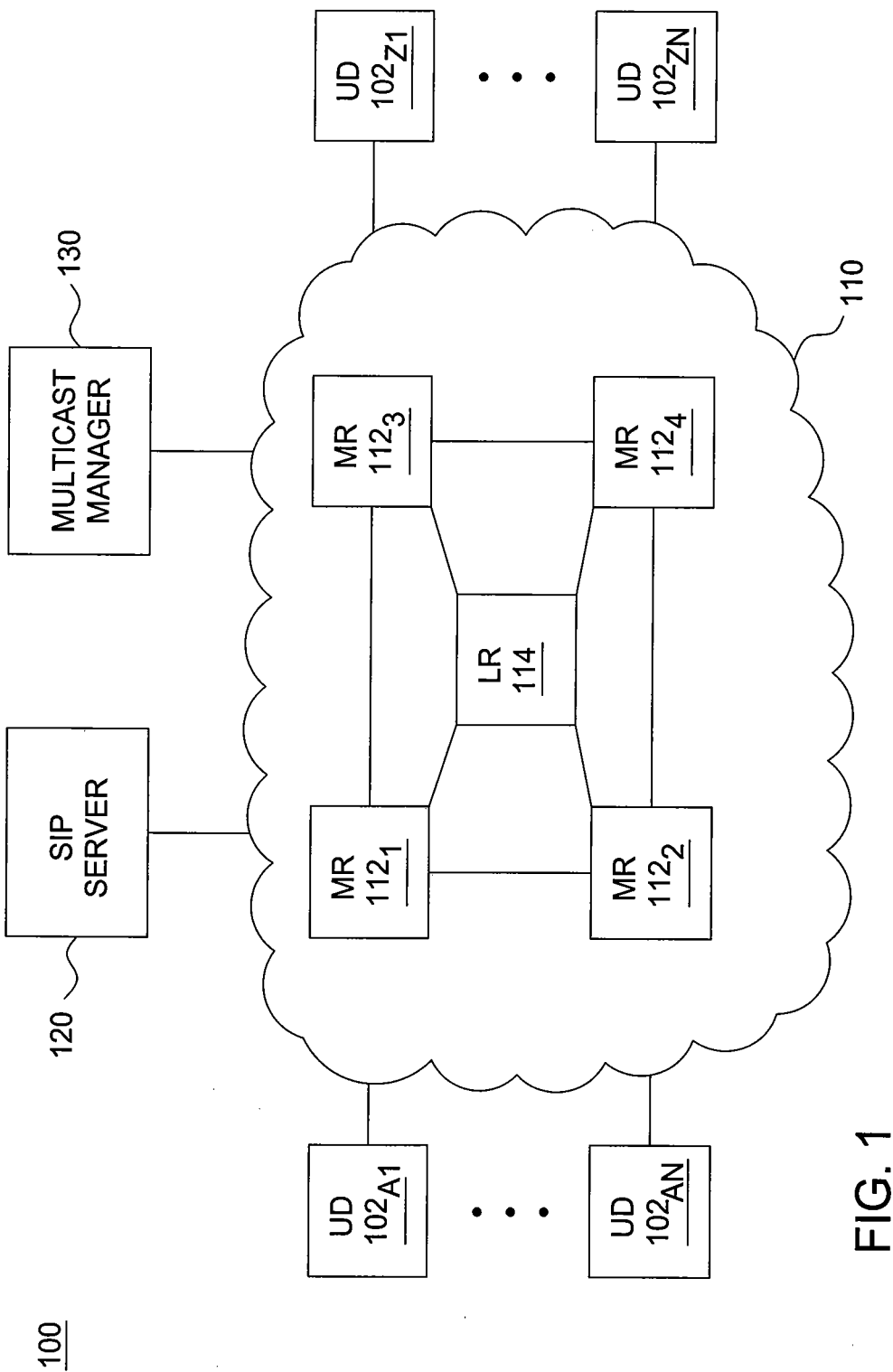
FIG. 1 depicts a high-level block diagram of a communication network.

FIG. 1 depicts a high-level block diagram of a communication network. Specifically, communication network 100 of FIG. 1 includes a plurality of user devices (UDs) $102_{A1}$-$102_{AZ}$ and $102_{Z1}$-$102_{ZN}$ (collectively, UDs 102), a transport network (TN) 110, a SIP server (SS) 120, and a Multicast Manager (MM) 130. The UDs $102_{A1}$-$102_{AZ}$ and $102_{Z1}$-$102_{ZN}$ communicate with TN 110 using respective communication paths which may include any network elements and communication links for transporting signaling and bearer traffic between UDs 102 and TN 110. The SS 120 and MM 130 communicate with TN 110 using respective communication paths which may include any network elements and communication links for transporting signaling traffic between SS 120 and MM 130 and TN 110.

The UDs 102 include devices operable for participating in multicast sessions. For example, UDs 102 may include telephones, computers, wireless phones, and the like, as well as various combinations thereof. The UDs 102 support multicast functions enabling participation in multicast sessions. The UDs 102 may invite other UDs 102 to join a multicast group and UDs 102 may request permission from other UDs 102 to join a multicast group. The UDs 102 may transmit to a multicast group without joining the multicast group. After joining a multicast group, UDs 102 may operate as receiving UDs and/or sending UDs. The UDs 102 may support various applications requiring multicast capabilities, such as video conferencing applications, instant messaging applications, and the like, as well as various combinations thereof.

The TN 110 includes a plurality of multicast routers (MRs) $112_1$-$112_4$ and a legacy router (LR) 114. The MRs 112 include routers including multicast functionality, including support for one or more multicast protocols (e.g., PIM, IGMP, MLD, and like multicast protocols, as well as various combinations thereof). The multicast functionality may include IP multicast functionality. The LR 114 includes a router lacking multicast functionality. The MRs 112 and LR 114 communicate using a plurality of communication paths (CPs) which may include any network elements and communication links adapted for transporting traffic between various combinations of MRs 112 and LR 114.

The SS 120 is a server supporting SIP signaling. The SS 120 may route SIP messages between UDs 102. For example, SS 120 may route SIP INVITE messages between UDs 102, thereby enabling UDs 102 to invite other UDs 102 to join a multicast group and enabling UDs 102 to request to join a multicast group. The SS 120 may route messages between UDs 102 and MM 130. The MM 130 is a system adapted for managing multicast functions. The MM 130 may perform at least a portion of the functions described herein, including identifying legacy routers, generating messages adapted for configuring legacy routers to support multicast functions (e.g., forwarding of multicast traffic), and the like, as well as various combinations thereof.

Although depicted and described with respect to specific numbers and configurations of UDs 102, MRs 112, LRs 114, SSs 120, and MMs 130, the present invention may be implemented using various other numbers and configurations of UDs 102, MRs 112, LRs 114, SSs 120, and MMs 130, or, in some embodiment, other network elements adapted for performing various combinations of functions depicted and described herein. The operation of UDs 102, MRs 112, LR 114, SS 120, and MM 130 in support of various multicast functions of the present invention may be better understood with respect to FIG. 2-FIG. 4.

Figure 2:
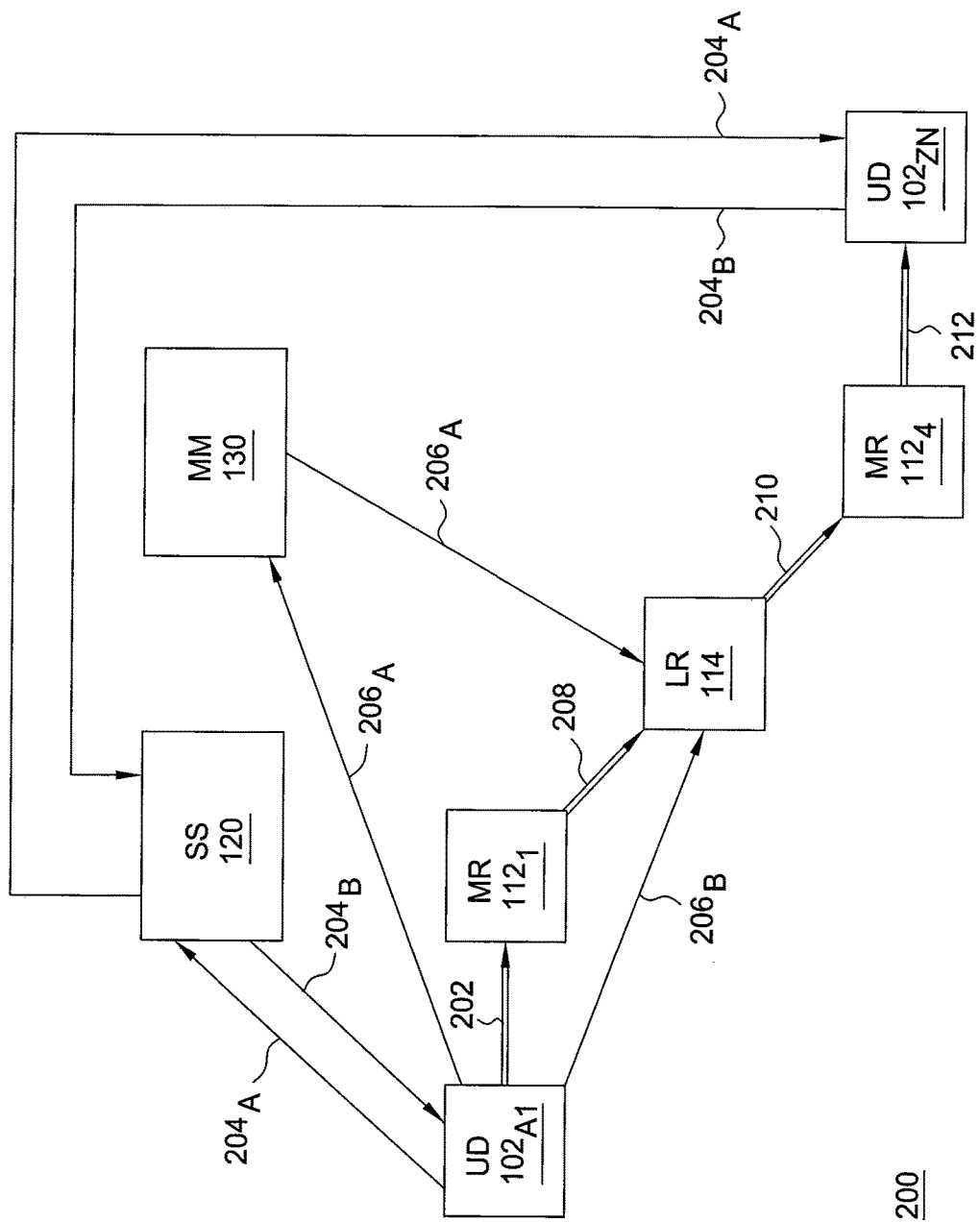
FIG. 2 depicts a high-level block diagram of a portion of the communication network of FIG. 1 including signaling according to one embodiment of the present invention.

FIG. 2 depicts a high-level block diagram of a portion of the communication network of FIG. 1 including signaling according to one embodiment of the present invention. The communication network portion 200 includes UD $102_{A1}$, MR $112_1$, LR 114, MR $112_4$, and UD $102_{ZN}$, as well as SS 120 and MM 130. The signaling depicted and described herein with respect to FIG. 2 is performed in order to establish a multicast path between UD $102_{A1}$ and UD $102_{ZN}$ which traverses MRs $112_1$ $112_4$, as well as LR 114 which is configured in order to support the multicast path between UD $102_{A1}$ and UD $102_{ZN}$. Although described herein with respect to an embodiment in which UD $102_{A1}$ is not a member of the multicast group, in one embodiment UD $102_{A1}$ may be a member of the multicast group to which UD $102_{A1}$ transmits.

At step 202, UD $102_{A1}$ transmits a multicast stream to a multicast address of a multicast group. In this example, the multicast group initially does not have any members. The multicast stream may include any traffic transmitted by UD $102_{A1}$ for delivery to members of the multicast group to which UD $102_{A1}$ transmits. The multicast steam is transmitted on a multicast address associated with the multicast group to which UD $102_{A1}$ transmits. For example, the multicast stream may be transmitted on multicast address 224.0.0.255. At step 204, UD $102_{ZN}$ joins the multicast group to which UD $102_{A1}$ transmits. There are many alternatives, two of which are described herein, by which UD $102_{ZN}$ may join the multicast group (denoted as steps $204_A$ and $204_B$, respectively).

At step $204_A$, UD $102_{A1}$ invites UD $102_{ZN}$ to join the multicast group. At step $204_A$, UD $102_{A1}$ generates a SIP INVITE message adapted to invite UD $102_{ZN}$ to join the multicast group. The UD $102_{A1}$ transmits the SIP INVITE message to SS 120, which routes the SIP INVITE message to UD $102_{ZN}$. The UD $102_{ZN}$ joins the multicast group in response to the SIP INVITE message received from UD $102_{ZN}$ via SS 120. Although omitted for purposes of clarity, in one embodiment, UD $102_{ZN}$ joins the multicast group by responding to the SIP INVITE message with a SIP OK message. The UD $102_{A1}$ may respond to the SIP OK message with a SIP ACK message to UD $102_{ZN}$. The SIP OK and SIP ACK messages may be routed through SS 120. Although omitted for purposes of clarity, in one embodiment, UD $102_{ZN}$ may decline the request to join the multicast group.

At step $204_B$, UD $102_{ZN}$ requests to join the multicast group (i.e., requests that UD $102_{A1}$ join UD $102_{ZN}$ to the multicast group). At step $204_B$, UD $102_{ZN}$ generates a SIP INVITE message adapted for requesting to join the multicast group. The UD $102_{ZN}$ transmits the SIP INVITE message to SS 120, which routes the SIP INVITE message to UD $102_{A1}$. The UD $102_{A1}$ joins UD $102_{ZN}$ to the multicast group in response to the SIP INVITE message received from UD $102_{ZN}$ via SS 120. Although omitted for purposes of clarity, in one embodiment, in response to the request by UD $102_{ZN}$ to join the multicast group, MM 130 may respond to the SIP INVITE message with a SIP OK message. The UD $102_{ZN}$ may respond to the SIP OK message with a SIP ACK message to MM 130. The SIP OK and SIP ACK messages may be routed through SS 120. Although omitted for purposes of clarity, in one embodiment, MM 130 may decline the request by UD $102_{ZN}$ to join the multicast group.

At step 206, LR 114 is configured to support the multicast stream from UD $102_{A1}$ to UD $102_{ZN}$. The configuration of LR 114 to support the multicast stream from UD $102_{A1}$ to UD $102_{ZN}$ may include transmitting a configuration message (or, in some embodiments, multiple configuration messages) to LR 114. The configuration message is adapted to configure LR 114 to forward traffic associated with the multicast stream from a first interface (on which the multicast stream is received from MR $112_1$) to a second interface (on which the multicast stream is transmitted to MR $112_4$). There are many alternatives, two of which are described herein, by which LR 114 may be configured to support the multicast stream from UD $102_{A1}$ to UD $102_{ZN}$ (denoted as steps $206_A$ and $206_B$, respectively).

At step $206_A$, UD $102_{A1}$ signals MM 130 to provide an indication that UD $102_{ZN}$ joined the multicast group. In another embodiment (omitted for purposes of clarity), in which MM 130 is implemented as a SIP application server, MM 130 may determine, based on signaling between UD $102_{A1}$ and UD $102_{ZN}$, that UD $102_{ZN}$ joined the multicast group, thereby obviating the need for direct signaling between UD $102_{A1}$ signals MM 130. Although described with respect to specific embodiments in which MM 130 is notified that UD $102_{ZN}$ joined the multicast group or, alternatively, detects that UD $102_{ZN}$ joined the multicast group, MM 130 may learn (e.g., be notified, detect, and the like) that UD $102_{ZN}$ joined the multicast group in various other ways.

In response to learning that UD $102_{ZN}$ joined the multicast group, MM 130 identifies each router along the multicast path between UD $102_{A1}$ and UD $102_{ZN}$ (illustratively, MR $112_1$, LR 114, MR $112_4$). The MM 130 determines whether any of the routers along the multicast path between UD $102_{A1}$ and UD $102_{ZN}$ include legacy routers (illustratively, LR 114). The MM 130 may determine whether any of the routers along the multicast path include legacy routers using network topology information, routing information, and the like, as well as various combinations thereof. In one embodiment, in which one or more routers along the multicast path is a legacy router, MM 130 may determine whether any of the legacy routers must be configured in response to UD $102_{ZN}$ joining the multicast group.

Upon determining that LR 114 is a legacy router (and, optionally, that LR 114 must be configured to support multicasting of traffic to UD $102_{ZN}$), the MM 130 forms a message (denoted as a configuration message) adapted to configure LR 114. The MM 130 transmits the configuration message to LR 114. In one embodiment, UD $102_{A1}$ also forms and transmits a configuration message to MRs 112. The configuration message adapted to configure LR 114 may be formed and transmitted using any message protocol/format adapted for conveying information used to configure a router. The LR 114 receives and processes the configuration message such that LR 114 is configured to support the multicast stream from UD 102$_{A1}$ to UD 102$_{ZN}$.

At step 206$_B$, UD 102$_{A1}$ identifies each router along the multicast path between UD 102$_{A1}$ and UD 102$_{ZN}$ (illustratively, MR 1121, LR 114, and MR 1124). The UD 102$_{A1}$ determines whether any of the routers along the multicast path between UD 102$_{A1}$ and UD 102$_{ZN}$ include legacy routers (illustratively, LR 114). The UD 102$_{A1}$ may determine whether any of the routers along the multicast path include legacy routers using network topology information, routing information, and the like, as well as various combinations thereof. In one embodiment, in which one or more routers along the multicast path is a legacy router, UD 102$_{A1}$ may determine whether any of the legacy routers must be configured in response to UD 102$_{ZN}$ joining the multicast group.

Upon determining that LR 114 is a legacy router (and, optionally, that LR 114 must be configured to support multicasting of traffic to UD 102$_{ZN}$), the UD 102$_{A1}$ forms a message (denoted as a configuration message) adapted to configure LR 114. The UD 102$_{A1}$ transmits the configuration message to LR 114. In one embodiment, UD 102$_{A1}$ also forms and transmits a configuration message to MRs 112. The configuration message adapted to configure LR 114 may be formed and transmitted using any message protocol/format adapted for conveying information used to configure a router. The LR 114 receives and processes the configuration message such that LR 114 is configured to support the multicast stream from UD 102$_{A1}$ to UD 102$_{ZN}$.

Depending on the configuration of the legacy router, when a UD 102 joins a multicast group, a legacy router may or may not be configured to start forwarding traffic of a multicast stream associated with the multicast group between one or more input interfaces and one or more output interfaces. In one embodiment, for example, in which each join of a UD 102 to the multicast group results in configuration of the legacy router to forward traffic from one input interface to an output interface associated only with that UD 102, when a UD 102 associated with the legacy router joins the multicast group, the legacy router is configured to start forwarding traffic from the input interface to the one output interface associated with the joining UD 102 (and continue forwarding multicast traffic from the input interface to other output interfaces for other UDs 102 which previously joined the multicast group).

In one embodiment, for example, in which a legacy router is configured to forward multicast traffic from one input interface to a plurality of output interfaces irrespective of which UDs 102 belong to the associated multicast group, when a first UD 102 associated with the legacy router (i.e., for which the multicast path traverses the legacy router) joins the multicast group, the legacy router is configured to start forwarding traffic from the input interface to the plurality of output interfaces. In this example, subsequent joins to the multicast group by UDs 102 associated with the legacy router do not result in additional configuration of the legacy router since the legacy router was previously configured in a manner for supporting forwarding of multicast traffic to subsequently joining UDs 102 associated with the legacy router.

At step 208, MR 112$_1$ transmits the multicast stream to LR 114. The MR 112$_1$ forwards the multicast stream using multicast functions supported by MR 112$_1$. The LR 114 receives the multicast stream from MR 112$_1$ on an input interface. The LR 114 forwards the multicast stream for that multicast group from the input interface to an output interface (according to the configuration of LR 114 in response to UD 102$_{ZN}$ joining the multicast group). At step 210, LR 114 transmits the multicast stream to MR 112$_4$. The MR 112$_4$ forwards the multicast stream using multicast functions supported by MR 112$_4$. At step 212, MR 112$_4$ transmits the multicast stream to UD 102$_{ZN}$. The UD 102$_{ZN}$ continues to receive the multicast stream until UD 102$_{ZN}$ requests to leave the multicast group (e.g., by initiating a SIP BYE message).

Although omitted for purposes of clarity, in one embodiment, in which a UD 102 (illustratively, UD 102$_{ZN}$) requests to leave the multicast group, the present invention may be used to configure one or more legacy routers in the multicast path between the sending UD 102 and the leaving UD 102 (i.e., any legacy routers configured to start forwarding traffic when the leaving UD 102 joined the multicast group) to stop forwarding the multicast stream toward the leaving UD 102. Depending on the configuration of the legacy router, a legacy router configured to start forwarding multicast traffic of a multicast stream between one or more input interfaces and one or more output interfaces when a UD 102 joins a multicast group may or may not be configured to stop forwarding traffic of the multicast stream between the one or more input interfaces and the one or more output interfaces when a UD 102 leaves the multicast group.

In one embodiment, for example, in which each join of a UD 102 to the multicast group results in configuration of the legacy router to forward traffic from one input interface to an output interface associated only with that UD 102, when a UD 102 associated with the legacy router leaves the multicast group, the legacy router may be configured to stop forwarding traffic from the input interface to the one output interface associated with the leaving UD 102 (and continue forwarding multicast traffic from the input interface to the other output interfaces for the other UDs 102). In one embodiment, for example, in which a legacy router is configured to forward multicast traffic from one input interface to multiple output interfaces irrespective of which UDs 102 belong to the associated multicast group, when a UD 102 associated with the legacy router (i.e., for which the multicast path traverses the legacy router) leaves the multicast group, the legacy router is only configured to stop forwarding traffic from the input interface to the multiple output interfaces if the leaving UD 102 is the final UD 102 associated with the legacy router to leave the multicast group.

In one embodiment, configuring of a legacy router to stop forwarding traffic of a multicast stream is similar to configuring of a legacy router to start forwarding traffic of a multicast stream. For example, with respect to FIG. 2, in response to detecting a request by UD 102$_{ZN}$ to leave the multicast group, either UD 102$_{A1}$ or MM 130 forms a message adapted to configure LR 114 to stop forwarding multicast traffic from the first interface of LR 114 to the second interface of LR 114. In one embodiment, UD 102$_{A1}$ or MM 130 may maintain, for each multicast group, a mapping of UDs 102 which belong to the multicast group and each of the legacy routers required to be configured when each of the UDs 102 which belong to the multicast group leave the multicast group.

Figure 3:
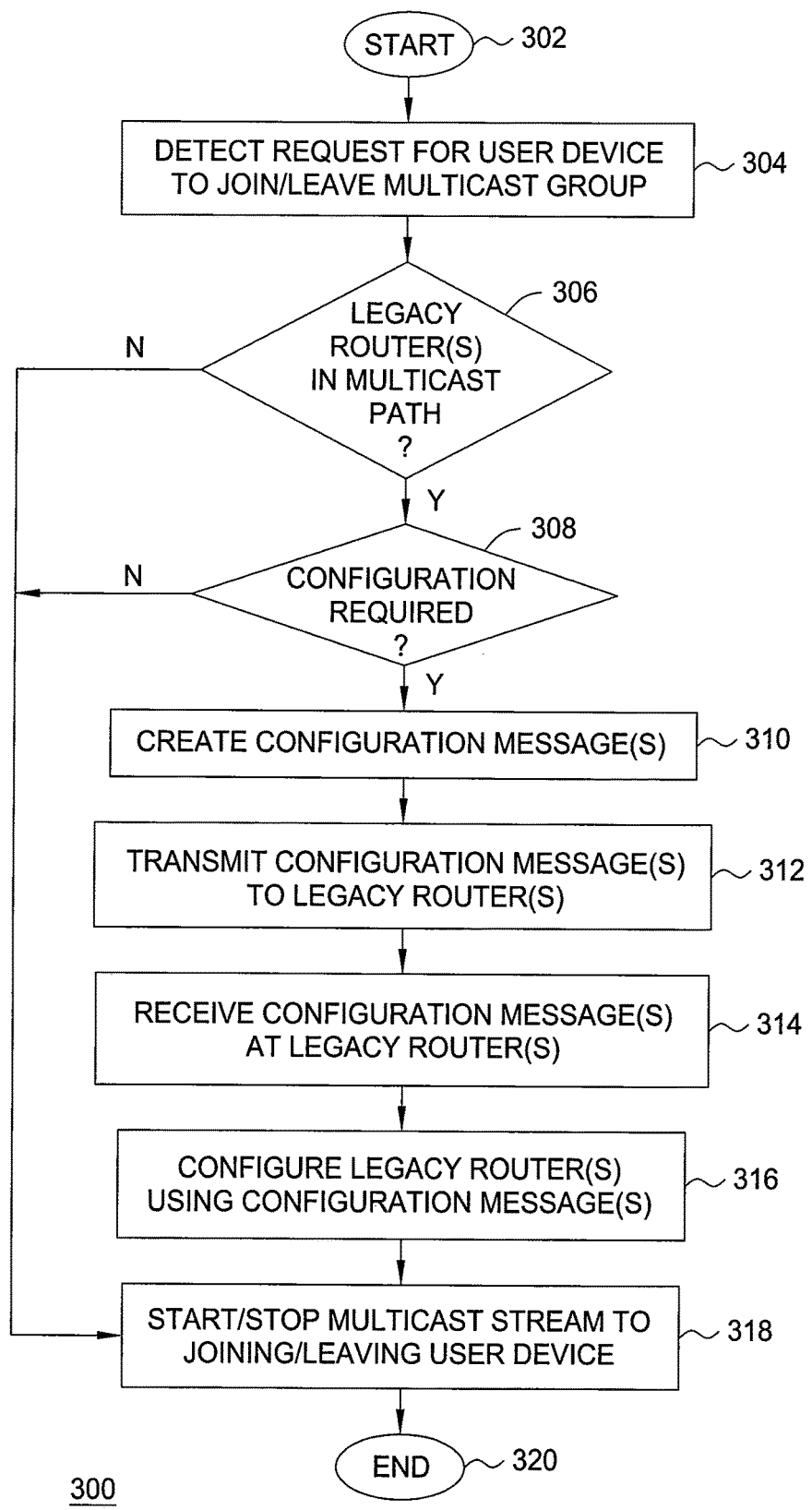
FIG. 3 depicts a method according to one embodiment of the present invention.

FIG. 3 depicts a method according to one embodiment of the present invention. Specifically, method 300 includes a method for configuring a legacy router to support IP multicast. Although depicted and described with respect to configuring one legacy router, in embodiments in which multiple legacy routers are located in a multicast path between a sending user device and the joining user device, each of the legacy routers may be configured. Although depicted and described as being performed serially, at least a portion of the steps of method 300 may be performed contemporaneously, or in a different order depicted in FIG. 3. The method 300 begins at step 302 and proceeds to step 304.

At step 304, a request for a UD to join/leave a multicast group is detected. The request may be detected by one or more UDs which formed the multicast group and/or operate as sending UDs, a system in communication with members of the multicast group (e.g., a SIP server, a multicast manager, and the like), and the like, as well as various combinations thereof. At step 306, a determination is made as to whether there are any legacy routers in the multicast path between one or more sending UDs and the UD for which the request to join/leave the multicast group is detected. If there are no legacy routers in the multicast path, method 300 proceeds to step 318. If there is a legacy router(s) in the multicast path, method 300 proceeds to step 308.

At step 308, a determination is made as to whether the legacy router(s) in the multicast path is required to be configured. If the legacy router(s) in the multicast path is not required to be configured, method 300 proceeds to step 318. If the legacy router(s) in the multicast path is required to be configured, method 300 proceeds to step 310. In one embodiment, the determination as to whether the legacy router(s) is required to be configured may be optional (e.g., in an embodiment, in which each join/leave of a user device to/from a multicast group in which a legacy router is located in the multicast path results in a configuration message to the legacy router(s).

In one embodiment, the determination as to whether a legacy router(s) in the multicast path is required to be configured may be made by MM 130. In one embodiment, MM 130 may determine whether a legacy router is required to be configured using information local to the MM 130. For example, MM 130 may maintain information indicative of the current state of each legacy router (e.g., MM 130 stores each forwarding rule established on each legacy router. In one embodiment, MM 130 may determine whether a legacy router is required to be configured by querying the legacy router in order to determine the current configuration of the legacy router for that multicast group. In one embodiment, MM 130 may determine the current configuration of the legacy router for that multicast group by querying one or more other systems and/or databases.

For example, assume that MM 130 receives an indication that another UD 102 joins an existing multicast, and further determines that LR 114 is in the multicast path for the joining UD 102. In one embodiment, MM 130 then determines (either from local information or information obtained by querying LR 114 or by querying some other system or database) that, for that particular multicast group, LR 114 is currently configured to forward traffic from an input interface to every output interface. In this example, MM 130 may determine that, since LR is already configured to forward traffic to all output interfaces, no further configuration of LR 114 is required in order to support the joining UD 102. Similarly, in other example, MM 130 may determine that the current configuration of LR 114 is insufficient to support multicasting to a joining UD 102 and, therefore, may proceed to configure LR 114 such that the joining UD 102 receives the multicast traffic for that multicast group.

At step 310, a configuration message(s) is formed. The configuration message(s) may be formed by one or more UDs which formed the multicast group and/or operate as sending UDs, a system in communication with members of the multicast group (e.g., a SIP server, a multicast manager, and the like), and the like, as well as various combinations thereof. At step 312, the configuration message(s) is transmitted to the legacy router(s). At step 314, the configuration message(s) is received by the legacy router(s). At step 316, the legacy router(s) is configured using the configuration message (i.e., self-configuration of the legacy routers). At step 318, the multicast stream to the joining/leaving UD is started/stopped. At step 320, method 300 ends.

The configuration of the legacy router may include creating, modifying, and/or deleting one or more IP tables, routing tables, address tables, mapping tables, and the like, as well as various combinations thereof, which may be used to control forwarding of multicast traffic between various combinations of interfaces of the legacy router. Depending on the functions supported by the legacy router, the legacy router may be configured one, or, optionally, multiple forwarding rules. In one embodiment, for example, the legacy router may be configured with multiple forwarding rules for at least a portion of the multicast groups having associated multicast paths which traverse the legacy router.

Although primarily described within the context of a multicast group including one user device (illustratively, UD $102_{ZN}$) which joined a multicast group to which another user device (illustratively, UD $102_{A1}$) is transmitting a multicast stream, the present invention may be used to configure one or more legacy routers for multicast groups having numerous user devices. In such embodiments, a legacy router may support IP multicast streams associated with multiple user devices. In one such embodiment, in which IP multicast traffic may be received by multiple input interfaces and/or transmitted by multiple output interfaces, the legacy router may be configured to forward traffic associated with an IP multicast stream from one or more input interfaces to one or more output interfaces. These embodiments may be better understood with respect to FIG. 4.

Figure 4:
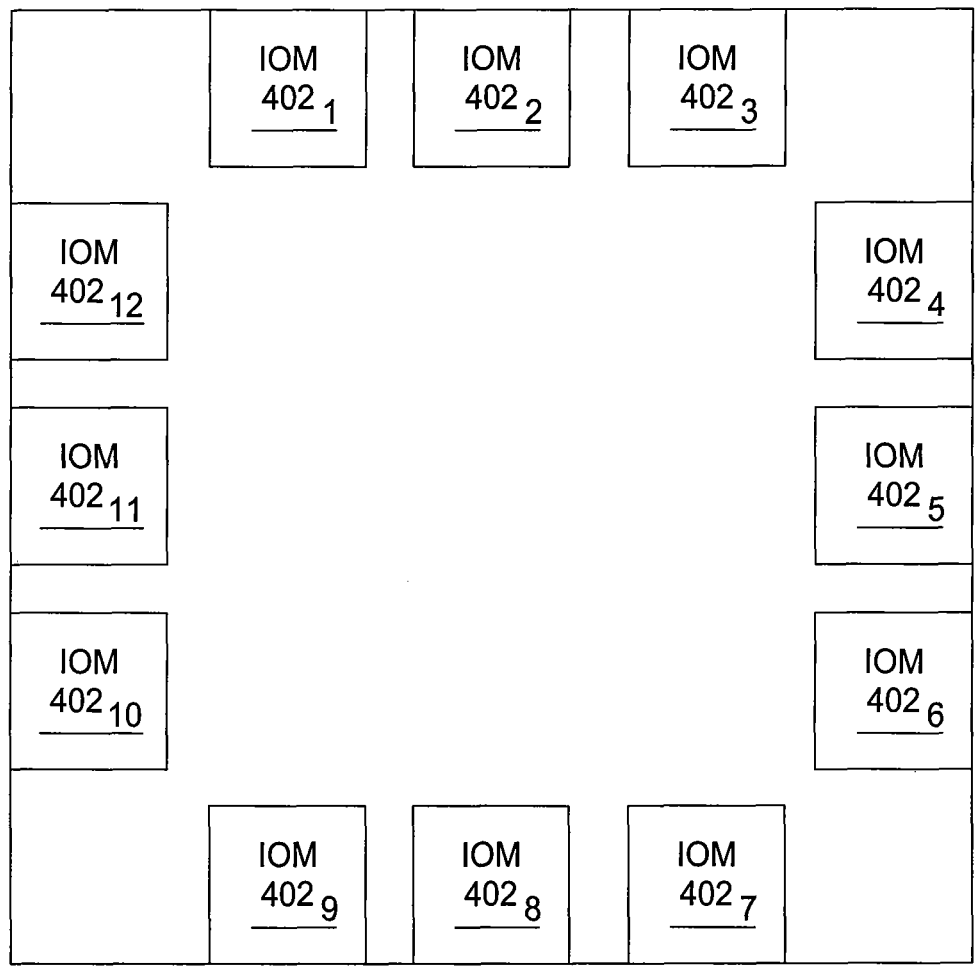
FIG. 4 depicts a high-level block diagram of a logical representation of a legacy router having multiple input/output.

FIG. 4 depicts a high-level block diagram of a logical representation of a legacy router having multiple input/output interfaces. Specifically, LR 114 of FIG. 4 includes a plurality of I/O modules (IOMs) $402_1$-$402_{12}$ (collectively, IOMs 402). Although, for purposes of clarity, twelve IOMs 402 are depicted, LR 114 may include fewer or more IOMs. As described herein, depending on specifics of the multicast group (e.g., members, capabilities, and the like, as well as various combinations thereof), LR 114 may be configured to start/stop forwarding traffic of a multicast stream from between any combination of IOMs 402. For example, LR 114 may be configured to forward traffic of a multicast stream from IOM $402_2$ to IOM $402_5$, from IOM $402_2$ to IOMs $402_7$, $402_{10}$, and $402_{12}$, from IOMs $402_1$, $402_2$, and $402_3$ to IOM $402_9$, and from each of IOMs $402_1$, $402_2$, and $402_3$ to each of IOMs $402_7$, $402_{10}$, and $402_{12}$.

Although primarily depicted and described herein with respect to an embodiment in which Source Specific Multicast (SSM) is used, the present invention may be implemented in embodiments in which Any Source Multicast (ASM) is used. For example, for SSM, LR 114 may be configured to start/stop forwarding traffic from IOM $402_1$ to IOM $402_2$ while, for ASM, LR 114 may be configured to start/stop forwarding traffic from IOM $402_1$ to IOM $402_2$ as well as from IOM $402_2$ to IOM $402_1$. Although primarily depicted and described herein with respect to configuration of legacy routers to start/stop forwarding traffic between specific combinations of interfaces, the present invention may be used to configure legacy routers to start/stop forwarding traffic between one or more input interfaces and one or more output interfaces.

Although primarily depicted and described herein with respect to an embodiment in which a legacy router is configured to support multicast functions, in other embodiments, other network elements (which may be more generally referred to herein as legacy nodes) may be configured to support multicast functions. In one embodiment, for example, legacy web servers may be configured to support multicast function. In this embodiment, legacy web servers may be configured using messages of various protocols and associated formats. In one such embodiment, legacy web servers may be configured using Hypertext Transfer Protocol (HTTP) signaling. In this embodiment, since HTTP is used in order for UDs 102 to join and leave the multicast group, SS 120 is not required.

Although primarily depicted and described herein with respect to an embodiment in which SIP signaling is used to dynamically configure legacy routers to support multicast functions, in other embodiments, various other protocols may be used to configure legacy routers to support multicast functions. For example, configuration messages used to configure legacy nodes may be formed and transmitted using various different message protocols and associated message formats, such as Simple Mail Transfer Protocol (SMTP), DIAMETER protocol, Common Open Policy Service (COPS) protocol, raw sockets, and the like, as well as various combinations thereof. The present invention is not limited by the protocol(s) and/or associated message format(s) of messages used to configure legacy routers to support multicast functions.

Figure 5:
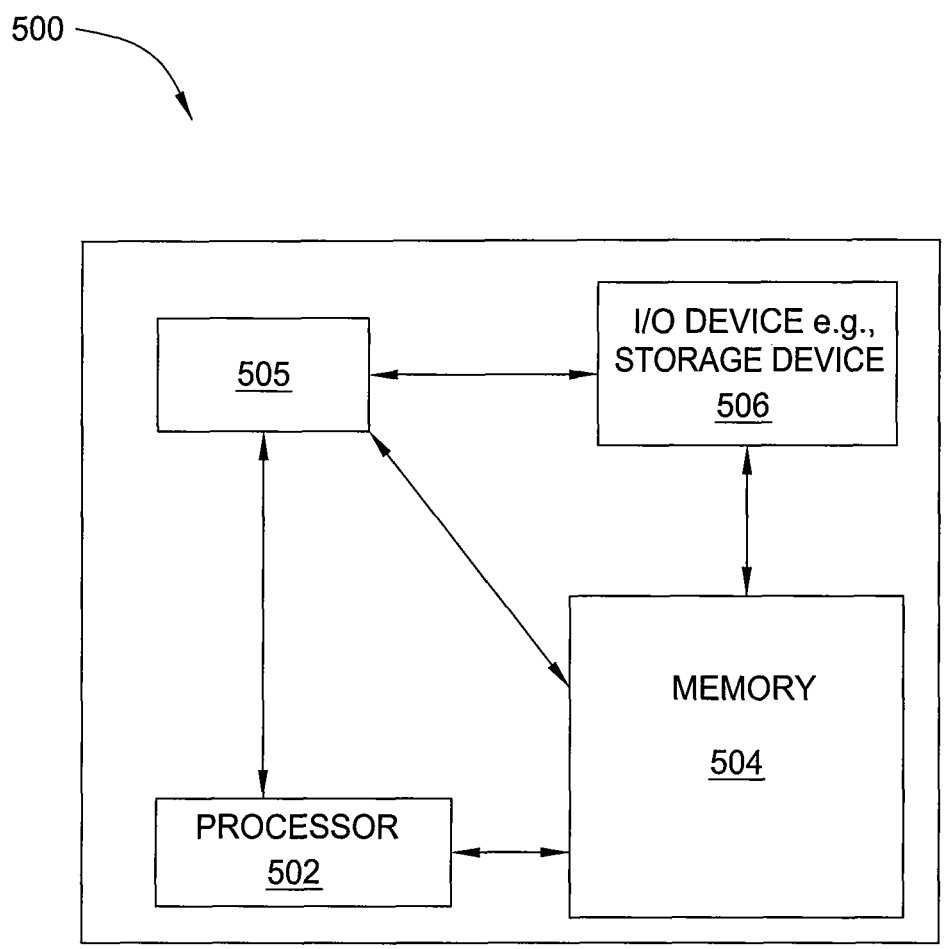
FIG. 5 depicts a high-level block diagram of a general-purpose computer suitable for use in performing at least a portion of the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a legacy node configuration module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present legacy node configuration module or process 505 can be loaded into memory 504 and executed by processor 502 to implement the functions as discussed above. As such, legacy node configuration process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for enabling configuration of a legacy node to support multicasting of traffic of a multicast group from a first user device to a second user device, the method comprising:
using a processor for:
detecting, at the first user device, a request for the second user device to join the multicast group;
determining, at the first user device, whether any node in a multicast path between the first user device and the second user device is a legacy node, wherein a legacy node is a node without Internet Protocol (IP) multicast functionality; and
in response to a determination that a node in the multicast path is a legacy node, generating a configuration message at the first user device, wherein the configuration message is adapted for use in configuring the legacy node to forward multicast traffic of the multicast group from a first interface of the legacy node to a second interface of the legacy node.

2. The method of claim 1, further comprising one of:
transmitting the configuration message toward the legacy node; and
transmitting the configuration message toward a multicast manager, wherein the multicast manager is configured to forward the configuration message toward the legacy node.

3. The method of claim 1, wherein the request for the second user device to join the multicast group is initiated by one of the first user device, the second user device, and a multicast manager.

4. The method of claim 1, wherein the request for the second user device to join the multicast group is conveyed using one of Session Initiation Protocol (SIP) signaling and Hypertext Transfer Protocol (HTTP) signaling.

5. The method of claim 1, wherein determining whether any node in the multicast path is a legacy node comprises:
identifying each node in the multicast path between the first user device and the second user device; and
determining, for each node in the multicast path, whether the node is a legacy node.

6. The method of claim 1, wherein the legacy node comprises one of a legacy router and a legacy web server.

7. The method of claim 1, further comprising:
in response to a request for the second user device to leave the multicast group, generating a second configuration message at the first user device, wherein the second configuration message is adapted for use in configuring the legacy node to stop forwarding multicast traffic of the multicast group from the first interface of the legacy node to the second interface of the legacy node.

8. The method of claim 1, wherein the configuration message is further adapted for use in configuring the legacy node to forward the multicast traffic from the second interface to the first interface.

9. An apparatus for enabling configuration of a legacy node to support multicasting of traffic of a multicast group from a first user device to a second user device, the apparatus comprising:
a processor and a memory, the processor configured to:
detect, at the first user device, a request for the second user device to join the multicast group;
determine, at the first user device, whether any node in a multicast path between the first user device and the second user device is a legacy node, wherein a legacy node is a node without Internet Protocol (IP) multicast functionality; and
in response to a determination that a node in the multicast path is a legacy node, generate a configuration message at the first user device, wherein the configuration message is adapted for use in configuring the legacy node to forward multicast traffic of the multicast group from a first interface of the legacy node to a second interface of the legacy node.

10. The apparatus of claim 9, wherein the processor is further configured to:
transmit the configuration message toward the legacy node; or
transmit the configuration message toward a multicast manager, wherein the multicast manager is configured to forward the configuration message toward the legacy node.

11. The apparatus of claim 9, wherein the request for the second user device to join the multicast group is initiated by one of the first user device, the second user device, and a multicast manager.

12. The apparatus of claim 9, wherein the request for the second user device to join the multicast group is conveyed using one of Session Initiation Protocol (SIP) signaling and Hypertext Transfer Protocol (HTTP) signaling.

13. The apparatus of claim 9, wherein determining whether any node in the multicast path is a legacy node comprises:
  identifying each node in the multicast path between the first user device and the second user device; and
  determining, for each node in the multicast path, whether the node is a legacy node.

14. The apparatus of claim 9, wherein the legacy node comprises one of a legacy router and a legacy web server.

15. The apparatus of claim 9, wherein the processor is further configured to:
  transmit a second configuration message toward the node in response to a request for the second user device to leave the multicast group, wherein the second configuration message is adapted for use in configuring the legacy node to stop forwarding multicast traffic of the multicast group from the first interface of the legacy node to the second interface of the legacy node.

16. The apparatus of claim 9, wherein the configuration message is further adapted for use in configuring the legacy node to forward the multicast traffic from the second interface to the first interface.

17. A method for enabling configuration of a legacy node to support multicasting of traffic of a multicast group from a first user device to a second user device, the method comprising:
  using a processor for:
    detecting, at a multicast manager, an indication that the second user device has joined the multicast group, wherein the indication is detected based on signaling associated with the first user device;
    determining, at the multicast manager, whether any node in a multicast path between the first user device and the second user device is a legacy node, wherein a legacy node is a node without Internet Protocol (IP) multicast functionality; and
    in response to a determination that a node in the multicast path is a legacy node, generating a configuration message at the multicast manager, wherein the configuration message is adapted for use in configuring the legacy node to forward multicast traffic of the multicast group from a first interface of the legacy node to a second interface of the legacy node.

18. The method of claim 17, wherein the signaling associated with the first user device is Session Initiation Protocol (SIP) signaling.

19. The method of claim 18, wherein the multicast manager is configured as a SIP Application Server, wherein the signaling associated with the first user device is detected by the multicast manager based on signaling between the first user device and the second user device.

20. The method of claim 18, wherein the signaling associated with the first user device is directed from the first user device to the multicast manager.

21. An apparatus for enabling configuration of a legacy node to support multicasting of traffic of a multicast group from a first user device to a second user device, the apparatus comprising:
  a processor and a memory, the processor configured to:
    detect, at a multicast manager, an indication that the second user device has joined the multicast group, wherein the indication is detected based on signaling associated with the first user device;
    determine, at the multicast manager, whether any node in a multicast path between the first user device and the second user device is a legacy node, wherein a legacy node is a node without Internet Protocol (IP) multicast functionality; and
    in response to a determination that a node in the multicast path is a legacy node, generate a configuration message at the multicast manager, wherein the configuration message is adapted for use in configuring the legacy node to forward multicast traffic of the multicast group from a first interface of the legacy node to a second interface of the legacy node.

* * * * *